United States Patent [19]

Saito et al.

[11] Patent Number: 5,479,335
[45] Date of Patent: Dec. 26, 1995

[54] REGULATED DC VOLTAGE POWER SUPPLY

[75] Inventors: Akira Saito, Kawasaki; Tsuneo Watanabe, Funabashi, both of Japan

[73] Assignee: Fuji Electric Co., Ltd., Kawasaki, Japan

[21] Appl. No.: 122,963

[22] Filed: Sep. 20, 1993

[30] Foreign Application Priority Data

Sep. 22, 1992 [JP] Japan .................................. 4-251752

[51] Int. Cl.⁶ .................................................. H02M 7/00
[52] U.S. Cl. .................................. 363/65; 363/69; 363/97
[58] Field of Search ................................ 363/65, 69, 70, 363/71, 97

[56] References Cited

U.S. PATENT DOCUMENTS

| | | | |
|---|---|---|---|
| 4,415,959 | 11/1983 | Vinciarelli | 363/21 |
| 4,648,020 | 3/1987 | Vinciarelli | 363/71 |
| 4,675,797 | 6/1987 | Vinciarelli | 363/21 |
| 4,882,120 | 11/1989 | Roe et al. | 363/98 |
| 5,245,525 | 9/1993 | Galloway et al. | 363/65 X |

FOREIGN PATENT DOCUMENTS

| | | |
|---|---|---|
| 58-12573A | 1/1983 | Japan . |
| 1-274662A | 11/1989 | Japan . |

*Primary Examiner*—Peter S. Wong
*Assistant Examiner*—Y. Jessica Han
*Attorney, Agent, or Firm*—Spencer, Frank & Schneider

[57] ABSTRACT

A regulated DC voltage power supply including a plurality of power circuits connected in parallel, and a control circuit. Each of the power circuits includes a switching device that chops the input DC voltage, and the control circuit includes a detecting circuit, a control IC, and a timing adjusting circuit. The ripple components of the output voltage produced as the output of the parallely connected power circuits is less than the ripple components of individual power circuits. This makes it possible to realize a small, high efficiency regulated DC voltage power supply with low rated current semiconductor switching devices.

6 Claims, 9 Drawing Sheets

REGULATED DC VOLTAGE POWER SUPPLY

BACKGROUND OF THE INVENTION

1. Field of the Invention

The present invention relates to a regulated DC voltage power supply that provides a DC load with a regulated DC voltage, and particularly to a circuit configuration of the regulated DC voltage power supply.

2. Description of Related Art

Various types of DC converters, such as forward type, flyback type, chopper type, etc., are used as a regulated DC voltage power supply for supplying a regulated DC voltage to diverse DC loads like electronic apparatuses.

FIGS. 1A–1C show forward type, flyback type, and down-voltage chopper type regulated DC voltage power supplies, respectively. In these figures, the reference numeral 10 designates a power circuit. The power circuit 10 of the forward type comprises a pair of input terminals 11, a MOSFET 12, a transformer 13, diodes 14 and 15, a filter 16, and a pair of output terminals 19. Here, the input terminals 11 receive a DC input voltage Vi supplied from a DC power supply not shown in this figure, and the MOSFET 12 chops the input DC voltage Vi. The transformer 13 comprises a primary winding 13a and a secondary winding 13b, and transforms the chopped DC voltage. The anode of the diode 14 is connected to a first terminal of the secondary winding 13b, the anode of the diode 15 is connected to a second terminal thereof, and the cathodes of the diodes 14 and 15 are connected in common to an input terminal 14a of the filter 16. The filter 16 comprises a reactor 16a connected between the terminal 14a and one of the output terminals 19, and a capacitor 16b connected between the terminals 19.

The power circuit 10 of the flyback type as shown in FIG. 1B differs from the power circuit 10 of the forward type of FIG. 1A in the following: It comprises a diode 14, and a filter 17 which includes a transformer 18 and a capacitor 16b, but does not comprise the transformer 13 and the diode 15. The transformer 18 comprises a primary winding 18a and a secondary winding 18b, and transforms the chopped DC voltage to be supplied to the diode 14. In addition, the transformer 18 functions as a reactor for smoothing. The output of the transformer 18 is rectified by the diode 14, and the rectified voltage is smoothed by the secondary winding 18b and the capacitor 16b.

The power circuit 10 of the down-voltage chopper type as shown in FIG. 1C differs from the power circuit 10 of the forward type of FIG. 1A in the following: It comprises a filter 16 and a diode 15, but does not comprise the transformer 13 and the diode 14. The filter 16 comprises a reactor 16a and a capacitor 16b, a first terminal of the reactor being connected to the cathode of the diode 15, and a second terminal thereof being connected to the capacitor 16b. The cathode of the diode 15 is further connected to the MOSFET 12 and the anode thereof is connected to the common line.

The reference numeral 100 designates a control circuit which delivers to the MOSFET 12 a switching signal that turns on and off the MOSFET 12 with a duty ratio specified in accordance with the DC output voltage Vo. To accomplish this, the control circuit 100 comprises a voltage divider 101, a detecting line 102, a control IC 103, and a drive circuit 105. Here, the voltage divider 101 comprises resistors 101a and 101b serially connected across the output terminals 19, and functions as a detector detecting the DC output voltage Vo. The detecting line 102 connects the connecting point 101c of the resistors 101a and 101b to the input terminal 103a of the control IC 103. In this case, the voltage at the input terminal is 1/k of the DC output voltage Vo, and corresponds to a load quantity required by a load. The control IC 103 produces a switching signal 104 whose duty ratio is determined in accordance with the voltage Vo/k at the input terminal 103a. More specifically, when the voltage Vo/k is equal to a predetermined reference voltage Vs, the duty ratio of the switching signal 104 is unchanged, when the voltage Vo/k is less than the reference voltage Vs, the duty ratio is increased, and when the voltage Vo/k is greater than the reference voltage Vs, the duty ratio is decreased. The drive circuit 105 amplifies the power of the switching signal 104 to generate a drive signal 106, and supplies the drive signal 106 to the gate 12a of the MOSFET 12.

Thus, the conventional regulated DC voltage power supply, irrespective of its type, switches the MOSFET 12 in accordance with the duty ratio of the driving signal 106 supplied from the control circuit 100. The MOSFET 12 is made conductive for a time Ton and nonconductive for a following time Toff, repeating the on-off operation at a cycle of Tc=Ton+Toff. Thus, the MOSFET 12 outputs the chopped voltage of the DC input voltage Vi which is fed to the filter 16 or 17 to be smoothed directly or via the transformer. The DC voltage which is smoothed to remove pulsating components is outputted from the output terminals. 19. Thus, the regulated DC output voltage Vo is produced whose voltage equals Vs×k, and which contains little ripples.

The relationship between the DC output voltage Vo and the DC input voltage Vi is expressed as the following equation (1) in the case of the forward type regulated DC voltage power supply.

$$Vo = Vi \times r \times (Ton/Tc) \tag{1}$$

where r is the turns ratio of the transformer 13, that is, (the number of turns of the secondary winding 13b)/(the number of turns of the primary winding 13a), arid (Ton/Tc) is the duty ratio.

When the regulated DC voltage power supply is mounted on an electronic apparatus, it is usually packaged on a printed board. As the performance of electronic apparatuses become higher, the increasing number of small capacity regulated DC voltage power supplies whose capacity is several to several tens of watts are required to be incorporated into individual electric circuits. To meet such requirements, the reduction in size of DC voltage regulated power supplies has been satisfied by employing the following techniques. First, semiconductor devices such as the semiconductor switch (MOSFET) 12, the diodes 14 and 15 the control IC 103, and the drive circuit 105 are incorporated on a single silicon chip. Second, the operation frequency f (f=1/Tc) for switching the semiconductor switch (MOSFET12) is set at a high frequency such as several hundred kilohertz. This is not only because the reactances of the reactor 16a and the transformer 18 used in the filters 16 and 17, and the capacitance of the capacitor 16b can be reduced in inverse proportion to the operation frequency f to achieve identical smoothing effects, but also because the cross-sectional areas of the cores of the transformers 13 and 18 can be reduced in inverse proportion to the operation frequency f when the flux density is maintained constant.

According to the conventional technique, it is possible to supply regulated DC voltages to loads using products considerably reduced in size.

Recently, however, electronic devices have been sharply reducing their size and weight owing to miniaturization of semiconductor chips such as LSI components employing fine processing, and high-density packaging techniques. In such situations, the following problems have arisen in connection with conventional DC voltage regulated power supplies. (1) Operation frequencies higher than 1 MHz will sharply increase losses in the cores of the transformers, thereby making it impossible to maintain the flux density constant. As a result, the reduction in size by employing a high operation frequency reaches its limit. Furthermore, in the case of reactors, an adverse effect due to stray capacity is added. (2) The loss of the semiconductor switch will increase with operation frequency. For example, a loss analysis of a flyback type regulated DC voltage power supply which was operated at 1 MHz provided the following results: 35% of the total loss arose from the semiconductor switch; 20% thereof arose from the transformer; and the remaining 45% arose from the other components. This shows that the semiconductor switch presents the greatest single loss, and this hinders the operation frequency from being increased further. (3) Although the size and number of the components has been reduced in the conventional regulated DC voltage power supply, its individual components are still mounted on a printed board. As a result, the miniaturization of the power supply itself reaches its limit owing to the size of the printed board. Furthermore, since active parts and passive parts are connected via conductor layers on a printed board, the operation of the power supply may be adversely affected by the stray inductance of the conductor layers when the operation frequency exceeds 1 MHz. As a result, the variation in performance of the power supply and erroneous operation due to external noise induced in the conductor layers will increase, thereby reducing the reliability of the power supply. Thus, the miniaturization of the regulated DC voltage power supply by increasing the operation frequency has reached its limit.

SUMMARY OF THE INVENTION

It is therefore an object of the present invention to provide a regulated DC voltage power supply which can be further miniaturized, and has a higher conversion efficiency.

According to a first aspect of the present invention, there is provided a regulated DC voltage power supply comprising:

a plurality of power circuits which are connected in parallel, each of the power circuits including a semiconductor switch chopping??? an input voltage, and a filter for smoothing the chopped voltage produced from the semiconductor switch;

detecting means for detecting an amount corresponding to a load quantity required by a load;

control means for generating an original switching signal whose duty ratio is determined on the basis of the detected amount by the detecting means; and timing adjusting means for generating a plurality of switching signals in response to the original switching signal, each of the switching signals turning on and off each one of the semiconductor switches of the plurality of power circuits at different timings.

Here the detecting means, the control means, and the timing adjusting means may be provided in common to the entire power circuits.

The regulated DC voltage power supply may be integrated into one chip.

Each of the power circuits may comprise a transformer which comprises a primary winding made of a thin film, a secondary winding made of a thin film, and a magnetic circuit made of a magnetic thin film.

The transformer may be a shell-type transformer, and the magnetic circuit of the transformer comprises slits formed perpendicularly to a winding direction of the primary and secondary windings.

The switching signals may be each shifted in timing by Tc/n, where Tc is the period of the original switching signal, and n is the number of the power circuits.

According to a second aspect of the present invention, there is provided a regulated DC voltage power supply comprising:

a plurality of regulated DC voltage power supply circuit groups connected in parallel, each of the regulated DC power supply circuit groups including, a plurality of power circuits which are connected in parallel, each of the power circuits including a semiconductor switch chopping an input voltage, and a filter smoothing the chopped voltage produced from the semiconductor switch, detecting means for detecting an amount corresponding to a load quantity required by a load, control means for starting generating an original switching signal when the detected amount exceeds a lower set value predetermined for each of the regulated DC voltage power supply circuit groups, and for stopping generating the original switching signal when the detected amount exceeds an upper set value predetermined for each of the regulated DC voltage power supply circuit groups, and timing adjusting means for generating a plurality of switching signals in response to the original switching signal, each of the switching signals turning on and off each one of the semiconductor switches of the plurality of power circuits at different timings.

The control means may generate the original switching signal whose duty ratio is determined in accordance with the detected amount by the detecting means.

The control means may generate the original switching signal whose duty ratio is constant regardless of the detected amount by the detecting means.

Each of the regulated DC voltage power supply circuit groups may have a different lower set value, and any one of the regulated DC voltage power supply circuit groups having a greater lower set value may have a greater upper set value.

According to a third aspect of the present invention, there is provided a regulated DC voltage power supply comprising:

a plurality of regulated DC voltage power supply circuit groups connected in parallel, each of which includes a plurality of power circuits which are connected in parallel, each of the power circuits including a semiconductor switch chopping an input voltage, and a filter smoothing the chopped voltage produced from the semiconductor switch; and control means for controlling switching timings of the semiconductor switch in each of the power circuits;

the control means including, detecting means for detecting an amount corresponding to a load quantity required by a load, control means for starting generating, for each of the regulated DC voltage power supply circuit groups, an original switching signal when the detected amount exceeds a lower set value predetermined for each of the regulated DC voltage power supply circuit groups, and for stopping generating the original switching signal when the detected amount exceeds an upper set value predetermined for each of the regulated DC voltage power supply circuit groups, and timing adjusting means for generating a plurality of switching signals in response to the original switching signal, each of the switching signals turning on and off each one of the semiconductor switches of the plurality of power circuits at different timings.

According to the present invention, the individual power circuits output the DC output voltages of the same voltage including ripple components of different phases because the semiconductor switches of the individual power circuits are switched on and off at different timings. Consequently, when the DC output voltages produced from the individual power circuits are connected in parallel, the ripple components interfere with each other, and are reduced or removed to some extent depending on the frequency of the ripple components, though the DC voltage component is not changed. As a result, the ratio of the ripple components to the DC voltage component becomes smaller than that of the DC output voltages of the individual power circuits.

On the other hand, if the ratio of the ripple components which is equal to that of the conventional power supply is allowed, greater ripple components are allowed to be contained in each output voltage of the power circuits. As a result, the smoothing performance of the filter in the power circuit can be reduced, and hence the reactance of the reactor or the capacitance of the capacitor of the filter can be reduced. This makes it possible to reduce the size of the regulated DC voltage power supply in its entirety.

Furthermore, since the current switched by the semiconductor switch in each power circuit is reduced in proportion to the number of power circuits connected in parallel, the rated current of the semiconductor switch can be reduced. This makes it possible to increase the switching speed of the semiconductor switches, thereby reducing the switching loss and increasing the conversion efficiency of the regulated DC voltage power supply.

In addition, when the power circuits are arranged into groups and operate on the group basis in such a manner that the power circuits in the same group start or stop supplying power at the same time, even if some power circuits included in the same group fail, the power supply can be maintained by the remaining power circuits. This is advantageous to the regulated DC voltage power supply in accordance with the present invention to be integrated into a single semiconductor chip.

Furthermore, integrating the regulated DC voltage power supply into a single chip by incorporating thin film transformers, reactors and capacitors into a single semiconductor substrate, in which all the active elements including the semiconductor switches are built, makes it possible to reduce the loss that could be induced in iron cores of the conventional transformer and reactor, and to eliminate problems associated with stray inductance involved in the printed board and with external noise. This also makes it possible to increase the operation frequency of the regulated DC voltage power supply. In addition, since the semiconductor switch is divided into a great number of switch elements, the rated current of individual switching elements can be reduced to a very small value, and hence the driving circuits of the switching elements can be removed. This will further miniaturize the regulated DC voltage power supply and improve its efficiency.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The present invention will now be described with reference to the accompanying drawings.

EMBODIMENT 1

Figure 1A:
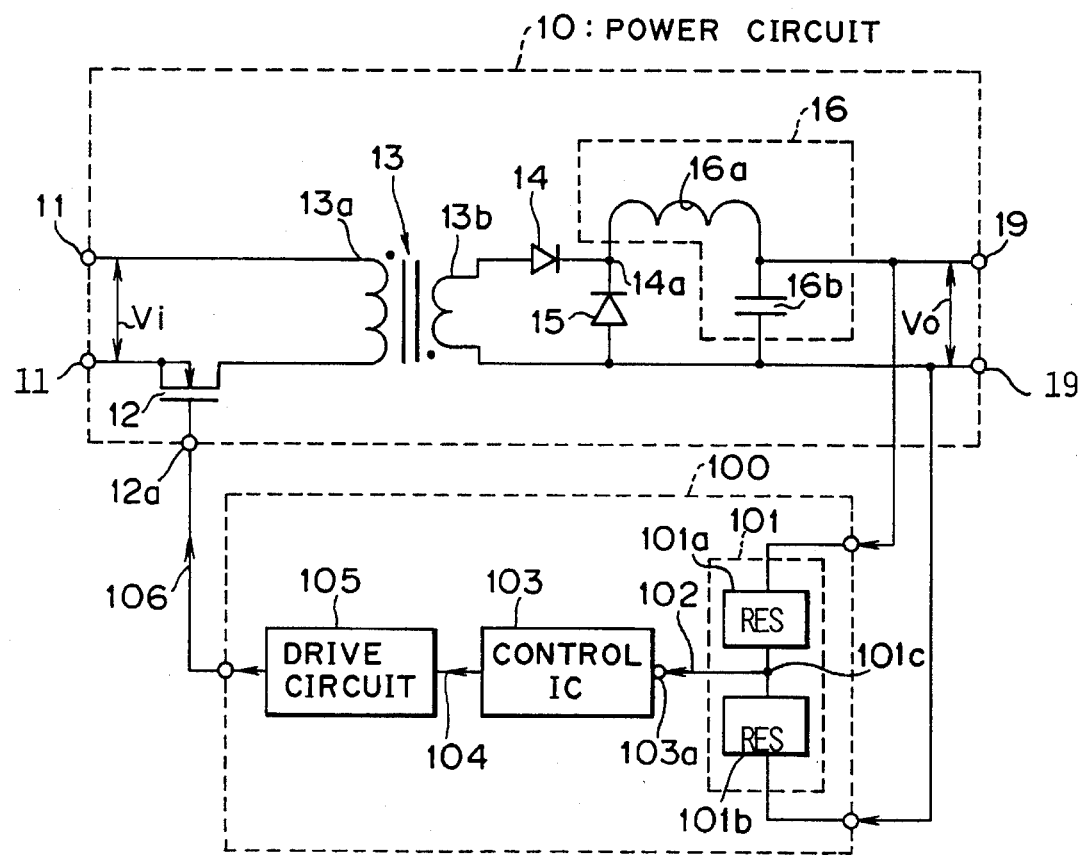
FIG. 1A is a block diagram showing a conventional forward type regulated DC voltage power supply.
Figure 1B:
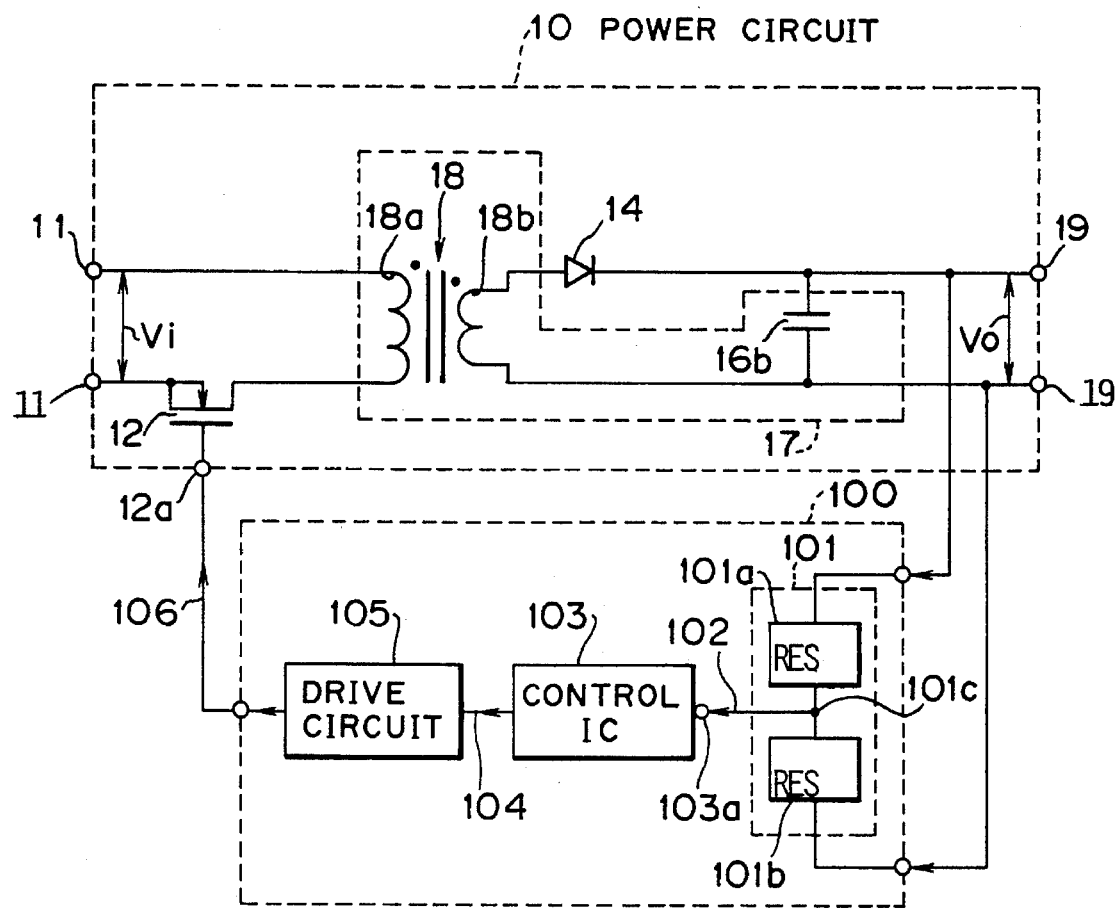
FIG. 1B is a block diagram showing a conventional flyback type regulated DC voltage power supply.
Figure 1C:
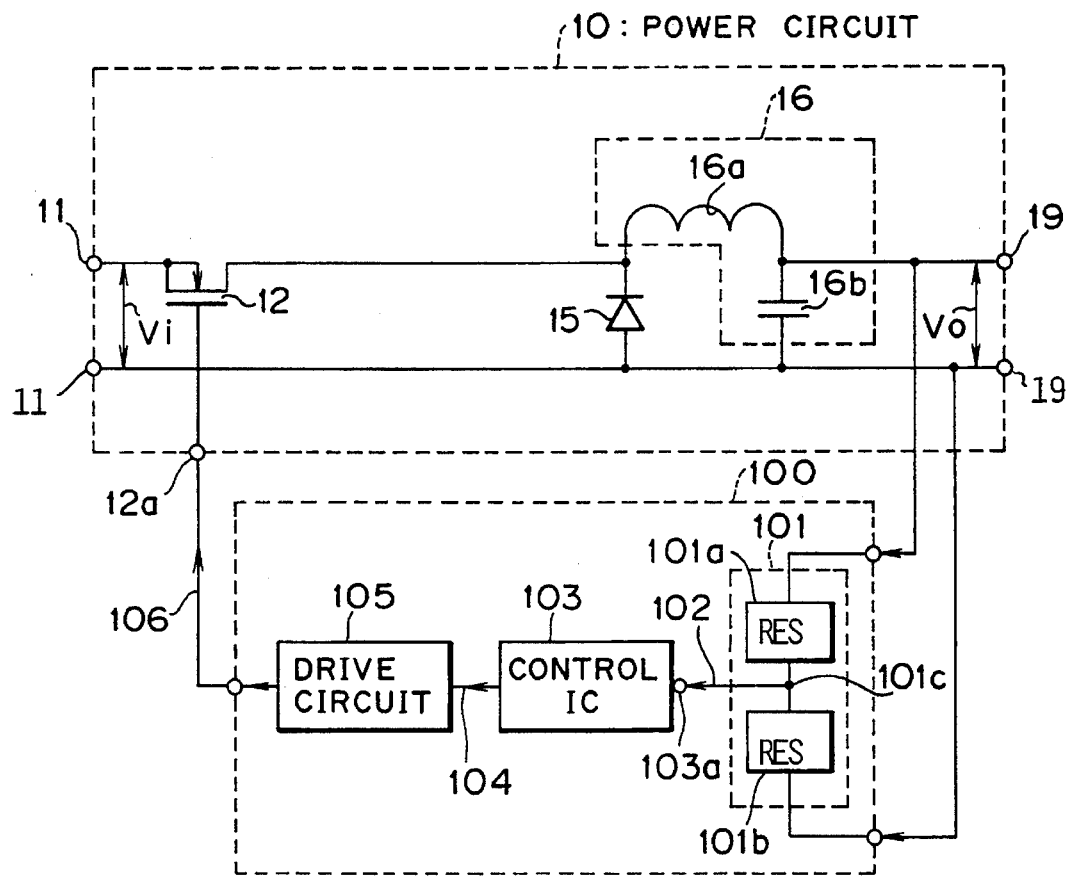
FIG. 1C is a block diagram showing a conventional down-voltage chopper type regulated DC voltage power supply.
Figure 2:
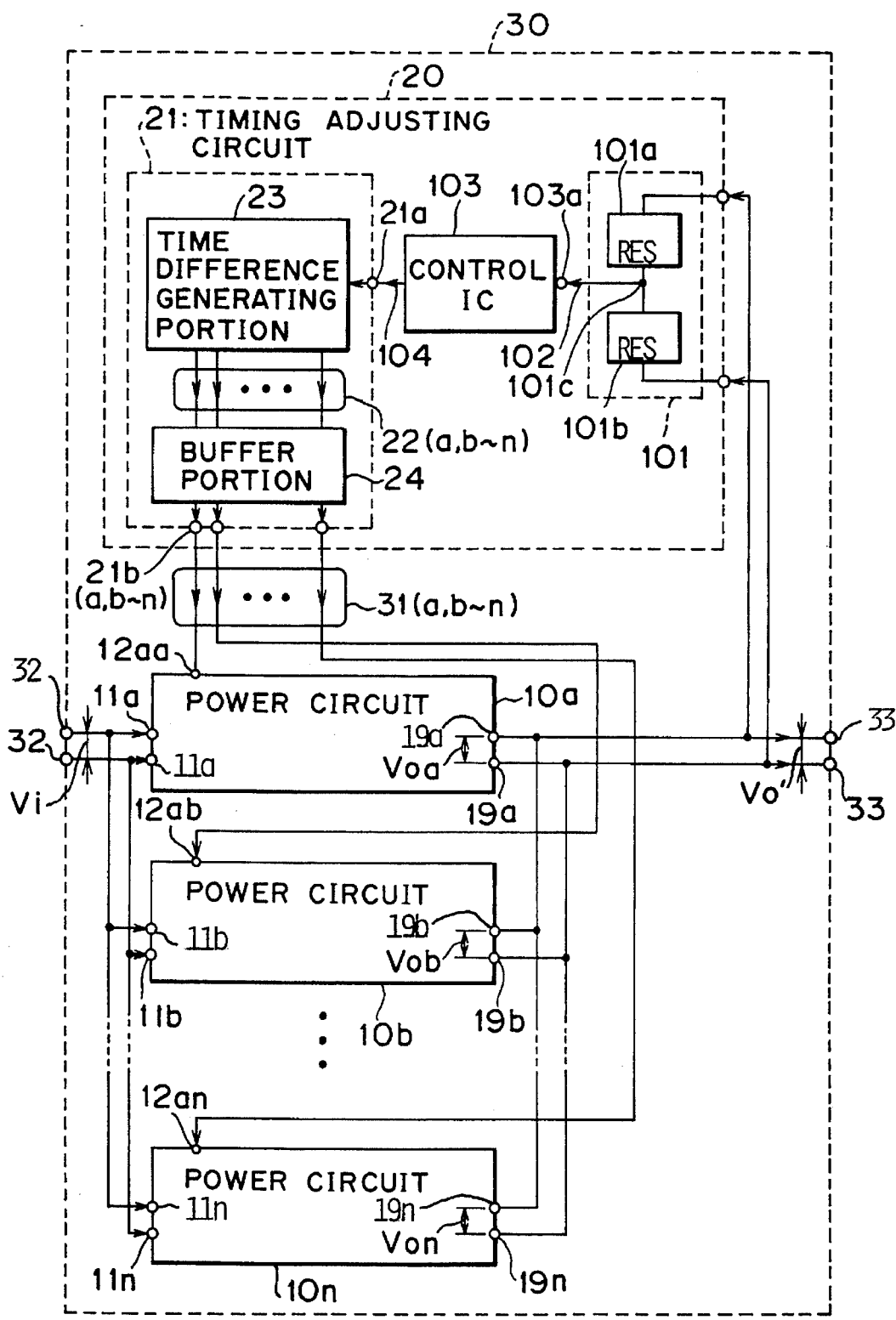
FIG. 2 is a block diagram showing a first embodiment of a regulated DC voltage power supply in accordance with the present invention.

FIG. 2 is a block diagram showing a first embodiment of a regulated DC voltage power supply in accordance with the present invention. FIGS. 3A, 3B and 3C illustrate waveforms of switching signals $22a$, $22b$, and $22n$ of FIG. 2. In FIGS. 2 and 3A–3C, like reference numerals designate like portions as in FIG. 1, and hence the description thereof is omitted.

In FIG. 2, the reference numeral 30 designates a regulated DC voltage power supply comprising a control circuit 20, n power circuits $10a$–$10n$, a pair of input terminals 32, and a pair of output terminals 33.

The power circuits $10a$–$10n$ are connected in parallel. In other words, the input terminals $11a$–$11n$ of respective power circuits $10a$–$10n$ are connected in common to the input terminals 32, and the outputs terminals $19a$–$19n$ thereof are connected in common to the output terminals 33. Thus, the input voltage Vi is applied to all the input terminals $11a$–$11n$, and the output voltages Voa–Von produced from individual output terminals $19a$–$19n$ are outputted from the output terminals 33 as the output voltage Vo'. Here, the power circuits $10a$–$10n$ may be any of the forward, flyback and chopper type regulated power supplies, but it is preferable that they be of the same type.

The control circuit 20 provides switching signals $31a$–$31n$ to the power circuits $10a$–$10n$, respectively. More specifically, the control circuit 20 detects the output voltage Vo' as an amount corresponding to a load quantity required by a load, and produces switching signals 31 ($31a$–$31n$) that control switching of MOSFETs 12 of individual power circuits 10a–10n in accordance with the duty ratio associated with the DC output voltage Vo'. The control circuit 20 comprises a resistive divider 101, a detection line 102, a control IC 103, and a timing adjusting circuit 21. Here, the resistive divider 101 functions as a detector of the DC output voltage Vo' across the output terminals 33, and the timing adjusting circuit 21 delivers switching signals 31a–31n to respective gates 12a (12aa–12an) of the semiconductor switches 12 at different timings in response to an original switching signal 104 outputted from the control IC 103.

Figure 3:
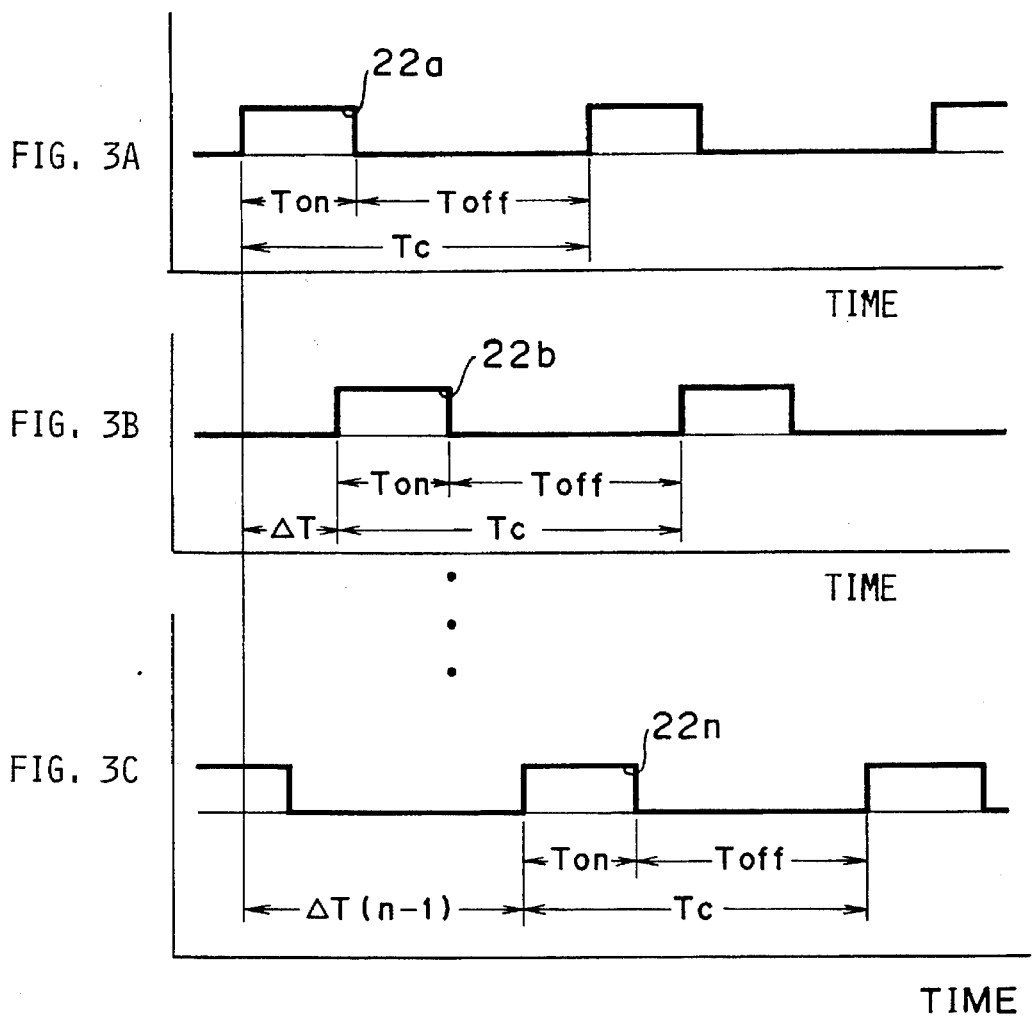
FIGS. 3A, 3B and 3C are diagrams illustrating switching signals of the first embodiment.

The timing adjusting circuit 21 comprises an input terminal 21a, a time difference generating portion 23, a buffer portion 24, and output terminals 21b (21ba–21bn). Here, the input terminal 21a receives the original switching signal 104. The time difference generating portion 23 produces in parallel n switching signals 22 (22a–22n), each of which has the same waveform as the original switching signal 104, and is sequentially produced at an interval of $\Delta T$ as shown in FIG. 3. The buffer portion 24 receives the switching signals 22, power amplifies signals 22, and parallelly outputs the switching signals 31 having the same waveform as the switching signals 22. The output terminals 21b (21ba–21bn) output the switching signals 31 as the output of the timing adjusting circuit 21.

With this arrangement, the power circuits 10a–10n produce the DC output voltages Voa–Von including ripple components. The phases of the ripple components included in the DC output voltages Voa–Von differ by the timing difference $\Delta T$ because each of the MOSFETs 12 is switched sequentially at the interval of $\Delta T$. The ripple components are composed of a fundamental component of the operating frequency f ($=1/Tc$), and its harmonic components having frequencies of an integral multiple of the fundamental frequency. As a result, although the DC voltage component of the DC output voltage Vo' is maintained constant, the ripple components interfere with each other so that they are reduced or eliminated, although the level of reduction is different depending on the frequencies.

As a typical example, let us suppose that the waveform generated by the switching operation of the individual MOSFETs is a precise square waveform, and its duty ratio (Ton/Tc) is 1/2. In this case, harmonic components included in the DC output voltages Voa–Von outputted from any two power circuits 10, wherein the MOSFETs 12 are switched with a phase difference of 180 degrees in terms of the electrical angle, are equal in amplitude and opposite in polarity to each other, and hence they cancel each other. Likewise, when the duty ratio Ton/Tc is 1/4, ripple components included in the DC output voltages Voa–Von outputted from any four power circuits 10, wherein the MOSFETs 12 are switched with a phase difference of 90 degrees in terms of the electrical angle from each other, cancel each other.

These operations are performed under ideal conditions with specific duty ratios. In practice, since the duty ratio is determined by the load quantity required by the load, duty ratios such as 1/2 and 1/4 do not always occur. However, parallel connection of the power circuits 10, in which the MOSFETs 12 are switched at different timings, makes it possible to reduce the ratio of ripple components to the DC component included in the DC output voltage Vo' at the output terminals 33 as compared with the ratios of ripple components in the individual DC output voltages Voa–Von produced from the individual power circuits 10, regardless of the value of the duty ratio. The timing difference $\Delta T$ is preferably determined as $\Delta T=Tc/n$ so that the ripple components of the DC output voltages Voa–Von produced from any individual power circuits 10 are reduced in the same manner under the same conditions.

In contrast, ripple components in the DC output voltages Voa–Von produced from the individual power circuits 10 can be increased compared with those of the conventional system, in the case where the ratio of the ripple components in the DC output voltage Vo' to the DC component thereof is allowed to remain at the same level as that of the conventional system. Accordingly, the requirements for the smoothing performance of the filters 16 and 17 of the power circuits 10 can be alleviated, that is, the reactance of the reactors and the capacitance of the capacitors of the filters can be reduced.

In addition, increasing the number of the power circuits 10a–10n constituting the regulated DC voltage power supply reduces the current to be switched by the MOSFET in each power circuit in proportion to the number n of the power circuits 10. The rated current of the MOSFET can be reduced by a factor of n. As a result, the chip size of the MOSFET 12 can also be reduced in accordance with the rated current. This makes it possible to reduce so called turn-off loss to an amount beyond the value proportional to the current. The turn-off loss, which takes place in a high speed turn-on-and-off operation of the switch, increases approximately in proportion to the spreading volume of the depletion layer in the semiconductor switching device. Thus, the total loss of the MOSFETs 12 of all the power circuits 10 can be reduced.

EMBODIMENT 2

Figure 4:
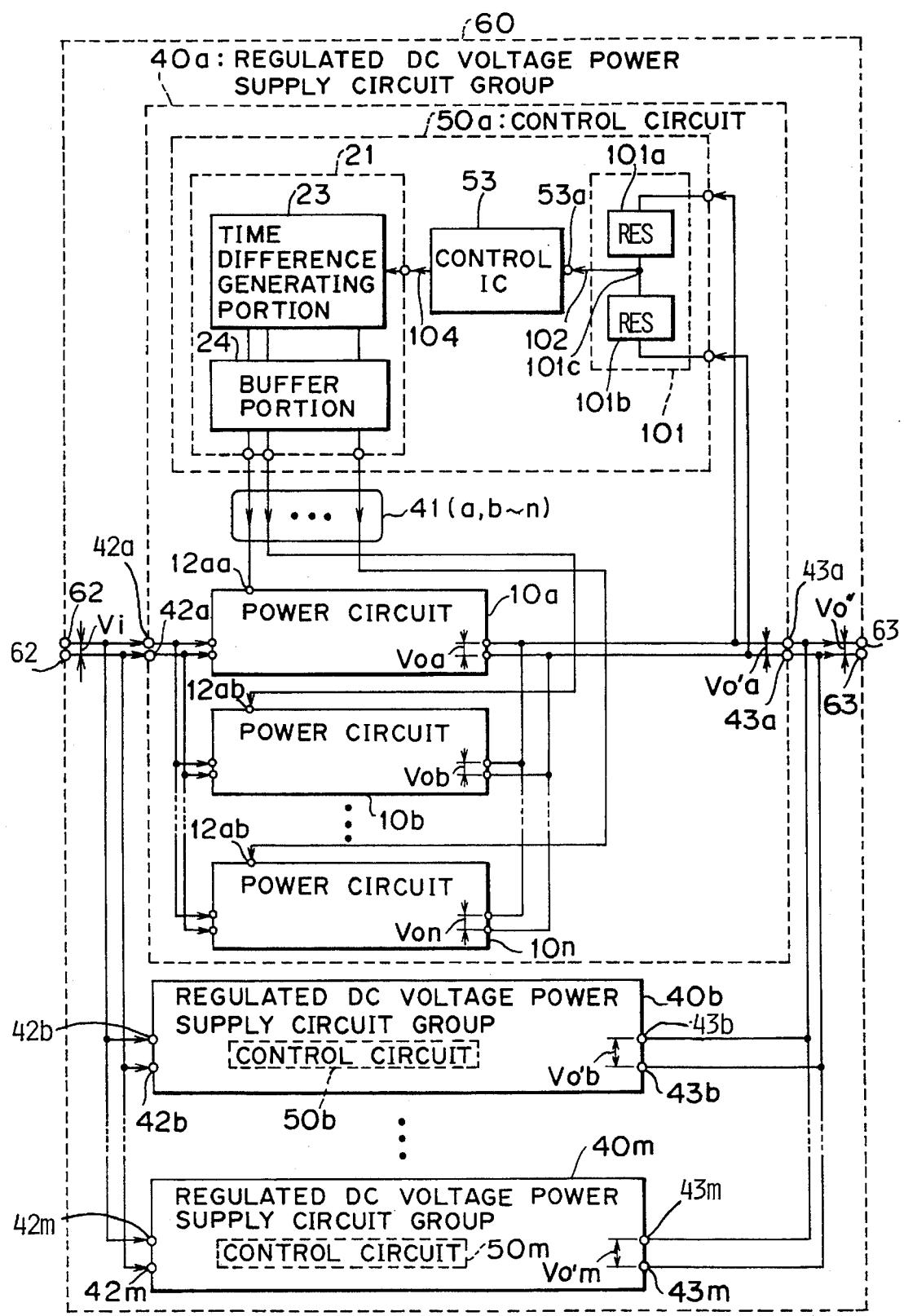
FIG. 4 is a block diagram showing a second embodiment of a regulated DC voltage power supply in accordance with the present invention.

FIG. 4 is a block diagram showing a second embodiment of a regulated DC voltage power supply in accordance with the present invention. In this figure, like portions are designated by the same reference numerals as in FIGS. 2 and 3A–3C.

In FIG. 4, a regulated DC voltage power supply 60 comprises a plurality of regulated DC voltage power supply circuit groups 40a–40m which are connected in parallel. That is, input terminals 42a–42m of the regulated power supply circuit groups 40a–40m are connected in parallel to a pair of input terminals 62, and output terminals 43a–43m of the regulated power supply circuit groups 40a–40m are connected in parallel to a pair of output terminals 63. The DC regulated output voltage Vo" is produced from the output terminals 63, and is supplied to a DC load not shown in this figure.

Each of the regulated DC voltage power supply circuit groups 40a–40m differs from the regulated power supply 30 of FIG. 2 in the structure of control circuits 50a–50m, which are provided in the regulated DC voltage power supply circuit groups 40a–40m, respectively.

All the control circuits 50a–50m have the same configuration. For example, the control circuit 50a comprises the resistive divider 101 dividing the DC output voltage Vo'a between a pair of output terminals 43a, the detecting line 102, a control IC 53, and the timing adjusting circuit 21. The control circuit 50a differs from the control circuit 20 of FIG. 2 in that it comprises the control IC 53 instead of the control IC 103. The control IC 53 detects the voltage Vd inputted to a terminal 53a, which equals the voltage at the connecting point 101c of the resistive divider 101, that is, $Vd=Vo'a/k$ ($=Vo'/k$).

The control ICs 53 of the control circuits 50a–50m compare the detected voltage Vd with lower limit values Vna–Vnm, and upper limit values Vpa–Vpm, respectively. Here, these values are set in advance as Vnm< . . . <Vnb<Vna<Vs <Vpm . . . <Vpb<Vpa, where Vs is an operation reference value.

Comparing these limit values with the detected voltage Vd, the control IC 53 of the control circuit 50x (x=a, b, . . . , m) operates as follows:

When Vd<Vnx (Vnx (Vnx denotes the lower limit value of the control circuit 50x)  (1)

In this case, the regulated power supply circuit group 40x is made active so that it starts supplying power to the load. For example, if Vd<Vnb, the control IC 53 of the regulated power supply circuit group 40b starts generating the original switching signal 104, and supplies it to the timing adjusting circuit 21 of the same group 40b. Likewise, if Vd<Vnm, the control IC 53 of the regulated power supply circuit group 40m starts generating the original switching signal 104, and feeds it to the timing adjusting circuit 21 of the same group 40m. Thus, a regulated DC voltage power supply circuit group 40x begins to supply power to the load every time the detected voltage Vd becomes less than the lower limit value Vnx.

When Vnx<Vd<Vpx  (2)

In this case, if Vd=Vs, the duty ratio of the original switching signal 104 is maintained. If Vd<vs, the duty ratio is increased, and if Vd>Vs, the duty ratio is decreased. The original switching signal 104 thus controlled is applied to the time difference generating portion 23.

The time difference generating portion 23 and the buffer portion 24 operate in a manner similar to those of FIG. 2, and the buffer portion 24 produces the switching signals 41a–41n, which are applied to the gates 12a of the MOSFETs 12 in the individual power circuits 10.

When Vd>Vpx  (3)

In this case, the original switching signal 104 is not fed to the time difference generating portion 23. Thus, the timing adjusting portion 21 does not generate the switching signals 41a–41n. As a result, the regulated output voltage Vo'x is not produced from the regulated DC voltage power supply circuit group 40x.

With the arrangement described above, the lower limit values Vna–Vnm of the control ICs 53 of the regulated DC voltage power supply circuit groups 40a–40m are determined in advance in such a manner that the relationships Vna>Vnb>Vnc . . . >Vnm are satisfied. Accordingly, an increasing number of the regulated power supply circuit groups 40a–40m are sequentially made active as the load quantity required by the load increases. Likewise, the upper limits Vpa–Vpm of the control ICs 53 of the regulated DC voltage power supply circuit groups 40a–40m are also predetermined in such a manner that the relationships Vpa>Vpb>Vpc . . . >Vpm are met. Thus, the number of regulated power supply circuit groups 40a–40m which actually supply power to the load is sequentially decreased in response to the reduction of the load quantity required by the load.

Furthermore, while the regulated DC voltage power supply circuit group 40x supplies the DC output voltage Vo'x, a plurality of power circuits 10 of that circuit group 40x operate on the group basis. More specifically, the power circuits 10 belonging to the same regulated DC voltage power supply circuit <group 40x simultaneously start supplying power to the load, or simultaneously stop supplying power, under the control of the control IC 53, in response to the changes in the load quantity. This makes it possible to continue supplying power without fail from the remaining power circuits 10 even if some power circuits 10 included in the same group are damaged. This is advantageous to integrating the regulated DC voltage power supply circuits onto a single semiconductor substrate.

So far, the MOSFETs 12 are supposed to operate in response to the duty ratio changed in accordance with the load quantity required by the load in this embodiment. The operation of the MOSFETs, however, is not restricted to this. For example, the duty ratio may be fixed. In this case, the control IC 53 need not have a function to change the duty ratio in accordance with the detected voltage Vd, and the duty ratio is preferably fixed at a value that could minimize the ripple components included in the DC output voltage Vo' depending on the number of power circuits 10.

Furthermore, although a correlate associated with the load quantity required by the load is supposed to be the DC output voltage Vo" between the terminals 63 in this embodiment, it is not restricted to that voltage. For example, the current supplied to the DC load may be used as the correlate associated with the load quantity.

EMBODIMENT 3

Figure 5:
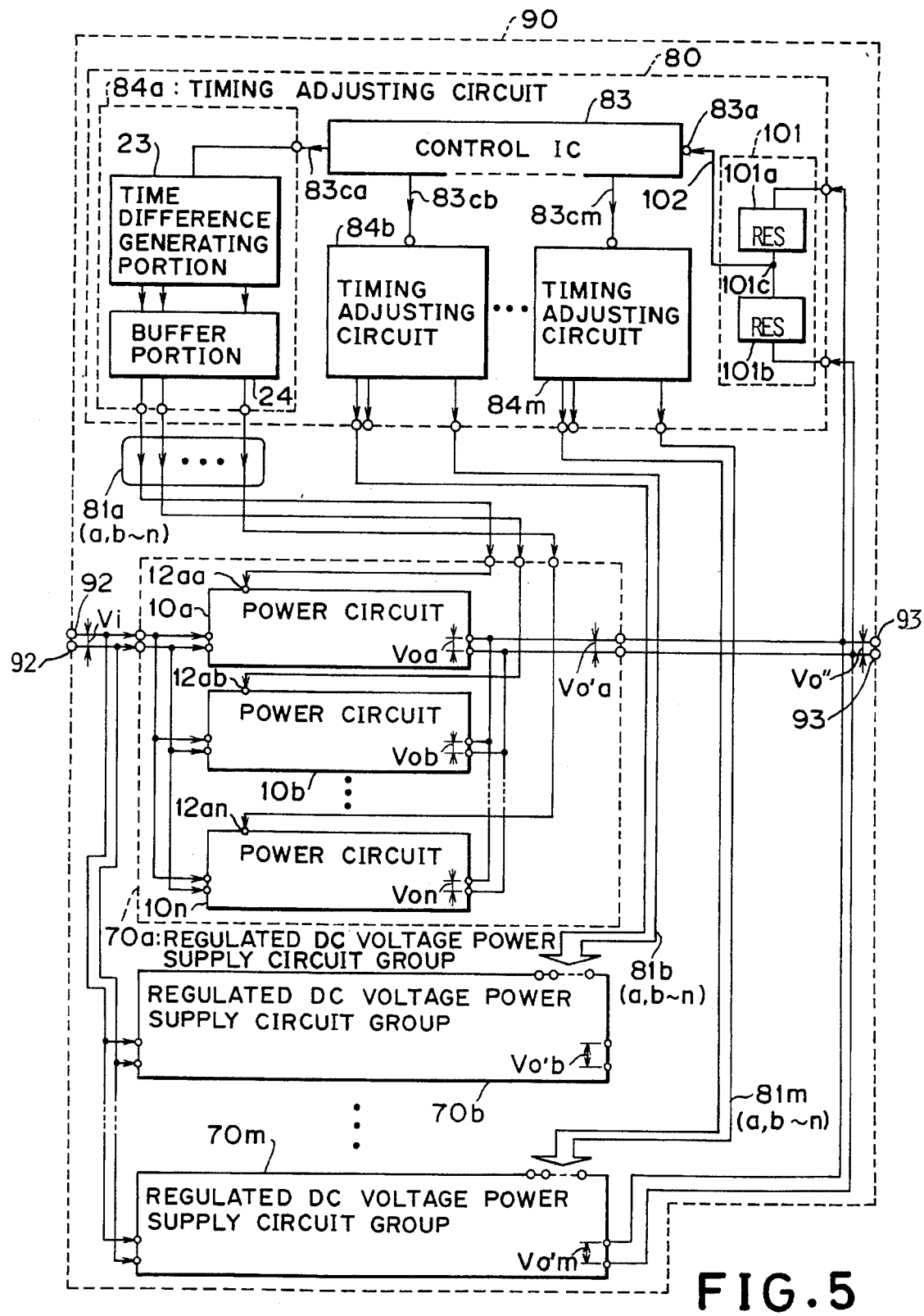
FIG. 5 is a block diagram showing a third embodiment of a regulated DC voltage power supply in accordance with the present invention.

FIG. 5 is a block diagram showing a third embodiment of the regulated DC voltage power supply in accordance with the present invention. In this figure, like portions are designated by the same reference numerals as in FIGS. 2 and 3A–3C, and the description thereof is omitted here.

In FIG. 5, a regulated DC voltage power supply 90 comprises a plurality of regulated DC voltage power supply circuit groups 70a–70m which are connected in parallel. That is, input terminals of the regulated power supply circuit groups 70a–70m are connected in parallel to a pair of input terminals 92, and output terminals of the regulated power supply circuit groups 70a–70m are connected in parallel to a pair of output terminals 93. The DC regulated output voltage Vo" is produced from the output terminals 93, and is supplied to a DC load not shown in this figure.

Each of the regulated DC voltage power supply circuit groups 70a–70m differs from the regulated DC voltage power supply circuit group 40a of FIG. 4 in that it has no control circuit 50a. Control portions are arranged into a single control circuit 80.

The control circuit 80 comprises the resistive divider 101, a control IC 83, and a plurality of timing adjusting circuits 84a–84m. The control IC 83 supplies original switching signals 83ca–83cm to the timing adjusting circuits 84a–84m, respectively, in response to the detected voltage Vd inputted to the input terminal 83a of the control IC 83. The timing adjusting circuits 84a–84m have the same configuration. For example, the timing adjusting circuits 84a receives the original switching signal 83ca, and produces switching signals 81aa–81an, the number of which equals the number of the power circuits 10 connected in parallel in the regulated DC voltage power supply circuit group 70a. The switching signals 81aa–81an are sequentially generated at an interval of ΔT and are supplied to the gates 12a of the semiconductor switches (MOSFETs) 12 in the power circuits 10, so that they are turned on and off at different timings.

The control IC 83 compares the detected voltage Vd with lower limit values Vna–Vnm, and upper limit values Vpa–Vpm, respectively. Here, these values are set for individual regulated DC voltage power supply circuit groups 70a–70m in advance, and are determined to satisfy the condition of Vnm< . . . <Vnb<Vna<Vs<Vpm . . . <Vpb<Vpa, where Vs is an operation reference value.

Comparing these limit values with the detected voltage Vd, the control IC 83 operates as follows:

When Vd<Vnx (Vnx denotes the lower limit value for the regulated power supply circuit group 70x)  (1).

In this case, the regulated power supply circuit group 70x is made active so that it starts supplying power to the load. For example, if Vd<Vnb, the original switching signal 83cb, which has the same waveform as the original switching signal 83ca, is newly delivered to the timing adjusting circuit 84b next to the circuit 84a. Likewise, if Vd<Vnm, the original switching signal 83cm, which has the same waveform as the original switching signal 83ca, is newly delivered to the timing adjusting circuit 84m. Thus, the regulated DC voltage power supply circuit group 70x begins to supply power to the load every time the detected voltage becomes less than the lower limit value Vnx.

When Vnx<Vd<Vpx        (2)

In this case, if Vd=Vs, the duty ratio of the original switching signal 83cx is maintained. If Vd<Vs, the duty ratio is increased, and if Vd>Vs, the duty ratio is decreased. The original switching signal 83cx thus controlled is applied to the timing adjusting circuit 84x.

When Vd>Vpx        (3)

In this case, deliverance of the original switching signal. 83cx to the timing adjusting circuit 84x is stopped. Thus, the timing adjusting circuit 84x does not generate the switching signals 81xa–81xn. As a result, the regulated output voltage Vo'x is not produced from the regulated DC voltage power supply circuit group 70x.

With the arrangement described above, while the regulated DC voltage power supply circuit group 70x supplies the DC output voltage Vo'x, a plurality of power circuits 10 of the circuit group 70x operate on a group basis. More specifically, the power circuits 10 belonging to the regulated DC voltage power supply circuit group 70x simultaneously start supplying power to the load, or simultaneously stop supplying power, under the control of the control IC 83, in response to the changes in the load quantity. This makes it possible to continue supplying power without fail from the remaining power circuits 10 even if some power circuits 10 included in the same group are damaged. This is advantageous for integrating the regulated DC voltage power supply circuits onto a single semiconductor substrate.

So far, the MOSFETs 12 are supposed to operate in response to the duty ratio changed in accordance with the load quantity required by the load in this embodiment. The operation of the MOSFETs, however, is not restricted to this. For example, the duty ratio may be fixed as in the second embodiment. In this case, the control IC 83 need not have a function to change the duty ratio in accordance with the detected voltage Vd, and the duty ratio is preferably fixed at a value that could minimize the ripple components included in the DC output voltages Vo'a–Vo'm depending on the number of power circuits 10.

Furthermore, although a correlate associated with the load quantity required by the load is supposed to be the DC output voltage Vo" between the terminals 93 in this embodiment, it is not restricted to that voltage. For example, the current supplied to the DC load may be used as the correlate associated with the load quantity.

EMBODIMENT 4

Figure 6:
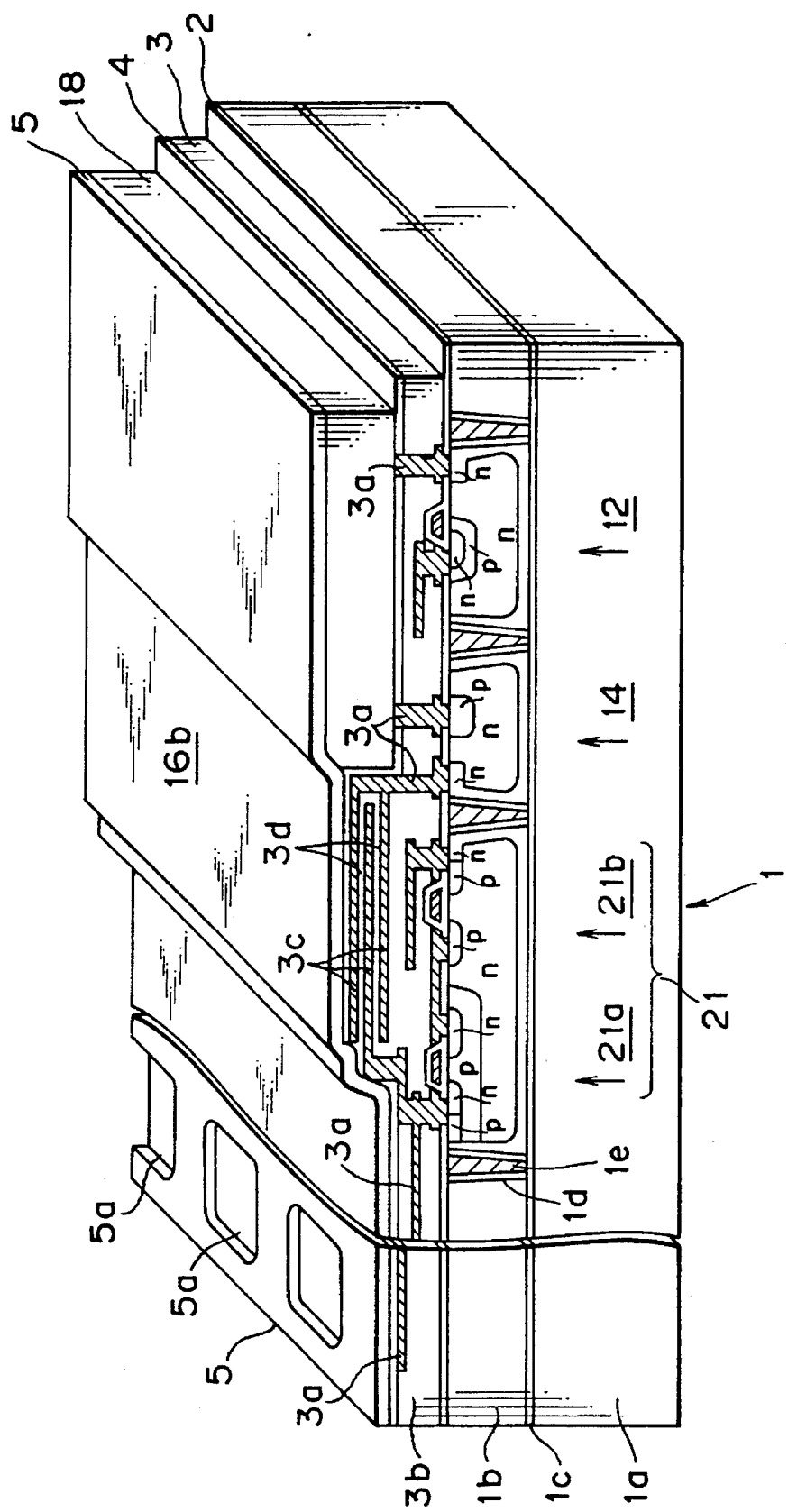
FIG. 6 is a perspective view showing a fourth embodiment of a regulated DC voltage power supply in accordance with the present invention.
Figure 7A:
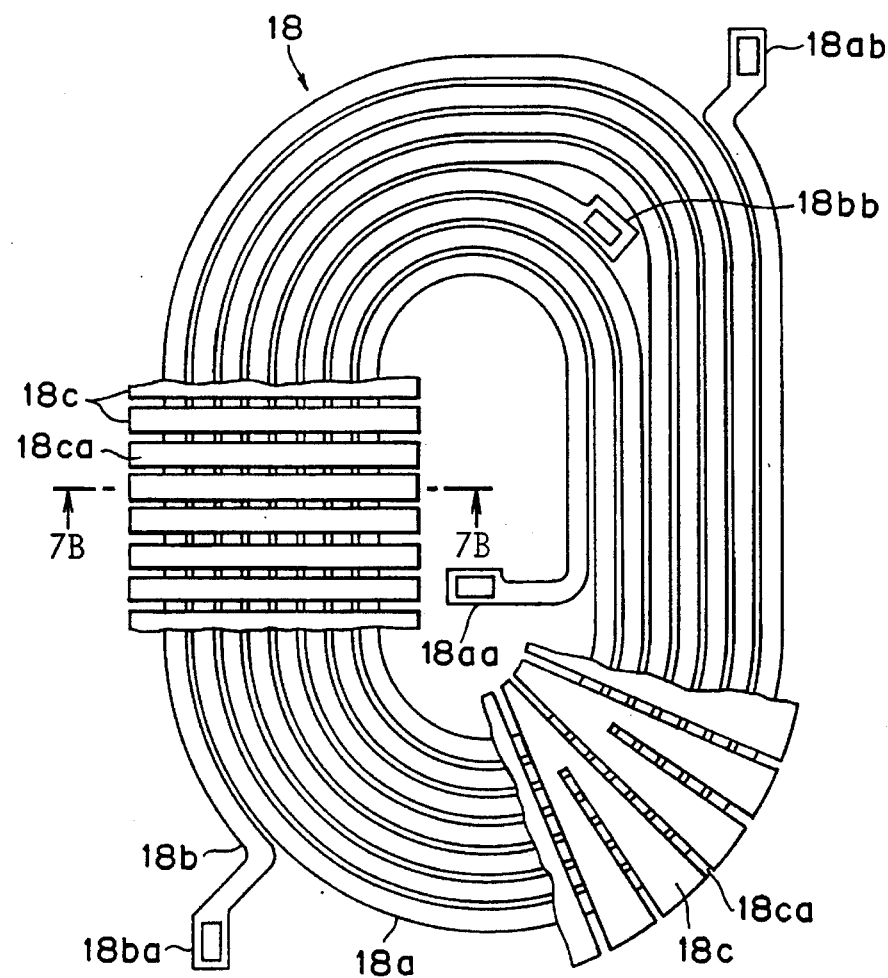
FIG. 7A is a partially cutaway plan view showing a thin film stack structure transformer shown in FIG. 6.
Figure 7B:
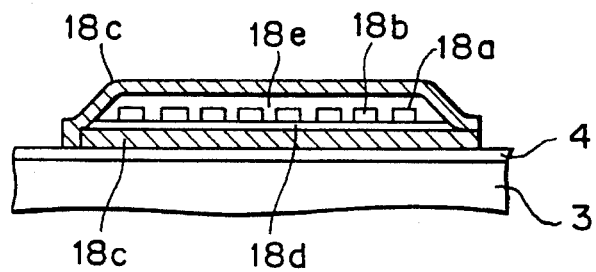
FIG. 7B is a cross-sectional view of the transformer taken along the line 7B—7B of FIG. 7A.

FIG. 6 is a perspective view illustrating the structure of a fourth embodiment of a flyback type DC regulated power supply in accordance with the present invention, FIG. 7A is a partially cutaway plan view of a transformer incorporated into the thin film stack structure as shown in FIG. 6, and FIG. 7B is a sectional view taken along the line X—X of FIG. 7A. In these figures, like reference numerals designate the same portions as those in FIGS. 2–5, and the description thereof is omitted here.

In FIG. 6, the reference numeral 1 designates a semiconductor chip into which a number of semiconductor devices such as the semiconductor switch (MOSFET) 12, the diode 14, the control IC 83 or 103, and the timing adjusting circuit 21 are integrated. This chip employs a so-called substrate junction type wafer in which several active device groups are dielectrically isolated from each other to prevent the interference between the groups built in the single chip. The wafer comprises a pair of stacked semiconductor substrates 1a and 1b sandwiching a silicon oxide film 1c therebetween. A plurality of grooves are formed in the semiconductor substrate 1b in such a manner that they reach the silicon oxide film 1c. The inner walls of the grooves are covered with dielectric films 1d, and the grooves are filled with polysilicon 1e. Thus, the substrate 1b are divided into several regions with the dielectric material, and the semiconductor devices are built in the individual semiconductor regions.

FIG. 6 illustrates the MOSFET 12 and the diode 14 which are shown in FIG. 1B, and p-channel field effect transistors 21a and 21b included in the timing adjusting circuit 21 shown in FIG. 2. The MOSFET 12 in each power circuit 10 is a vertical MOSFET, and the diode 14 is also of a vertical type. The top surface of the substrate 1b is covered with an interlayer insulating film 2 made of a material such as phosphosilicate glass as in common semiconductor devices, in such a manner that the polysilicon gate of the MOSFET 12 is covered from the top.

A wiring layer 3 has a multilevel interconnection structure which comprises multilevel wiring films 3a and an insulating film 3b. The wiring films 3a comprise a metal such as aluminum interconnecting the active devices formed in the substrate 1b with ohmic contact through apertures made in the insulating film 2. The insulating film 3b is made of silicon oxide films disposed between wiring films 3a. In this embodiment, the wiring layer 3 is partially projected upward as shown in FIG. 6, wherein a capacitor 16b are built. The capacitor 16b comprises multilevel electrode films 3c made of the same aluminum films as the wiring films 3a, and dielectric films 3d made of silicon oxide interposed between the electrode films 3c. The capacitor 16b is connected to the diode 14 and the FET 21a via the wiring films 3a. The top layer of the wiring layer 3 is covered by an insulating film 4.

The flyback transformer 18 is built on the insulating film 4, and its detailed structure is illustrated in FIGS. 7A and 7B. Finally, the top surface of the wiring layer 3 and the transformer 18 are covered with a protective film 5 made of silicon nitride or the like. Apertures 5a are formed in the protective film 5 so that the wiring films 3a are partially exposed to form connecting pads for the input terminals 32 and the output terminals 33 in FIG. 2.

As shown in FIGS. 7A and 7B, the transformer 18 comprises a lower magnetic thin film 18c, an insulating film 18d, a primary coil 18a and a secondary coil 18b, an insulating film 18e and an upper magnetic thin film 18c, which are successively stacked in this order on the insulating film 4. The transformer 18 has a so-called shell structure in which the lower and upper magnetic thin films 18c enclose the primary coil 18a and the secondary coil 18b. The primary coil 18a and the secondary coil 18b are spirally formed, and their terminals 18aa, 18ab, 18ba and 18bb are connected to the MOSFET 12 and the diode 14 via the wiring films 3a shown in FIG. 6. In the example, as shown in FIG. 7A, the numbers of turns of the coils 18a and 18b are 6 and 2.5, respectively, and hence the turns ratio is 2.4. The two coils are wound so that their winding directions are opposite to each other.

The coils 18a and 18b are composed as follows: First, a thin film conductor of several micrometers to several tens of micrometers thick, which is made of a highly conductive metal such as aluminum, copper or silver, is formed on the insulating film 18d by a sputtering technique or evaporation technique. Second, the thin film conductor is formed into spiral patterns composed of flat conductors whose width is several tens micrometers to one hundred micrometers by using a photoetching process commonly used in the semiconductor fabrication process. The magnetic thin films 18c are formed by applying a sputtering technique to a ferromagnetic metal of a Permalloy series and the like with a soft magnetic property, and are preferably formed in the amorphous state into a thin film of ten micrometers to several tens of micrometers thick. The upper magnetic thin film 18c is formed in such a manner that its slits 18ca are perpendicular to the winding directions of the coils 18a and 18b, so that high frequency loss can be minimized. The slits 18ca are formed at an interval of ten micrometers to several tens of micrometers.

With this arrangement, high frequency loss in the transformer 18 is reduced, and hence the characteristics of the switching frequency can be improved at frequencies higher than 1 MHz as compared with the conventional device. Thus, the transformer 18 can have a high inductance value of about several microhenry even at 10 MHz. This makes it possible to reduce the size of the transformer 18 to several millimeters square to 20 millimeters square, thereby facilitating mounting it on a semiconductor chip. In addition, the thickness of the stack structure itself can be reduced to less than 100 micrometers because it has a thin film structure.

A transformer 18 of such a thin film structure is mounted on or incorporated into the wiring layer 3 as shown in FIG. 6 before the wafer is diced into the semiconductor chip 1. After that, the wafer is covered with a protective film 5, and is diced into individual chips. According to the present invention, the regulated DC voltage power supply can be fabricated in the form of a single integrated chip by using a semiconductor process technique. Since the switching power device in accordance with the present invention has a small one chip structure incorporating the transformer 18 and the capacitor 16b, no connections via printed wiring is needed, and hence it can be incorporated into an electronic apparatus or an electronic circuit by simply connecting it via the connecting pads.

The regulated DC voltage power supply of the integrated structure makes it possible to build a great number of power circuits 10 into one body. For example, more than one thousand power circuits 10 can be easily incorporated into a single regulated DC voltage power supply in the case where the regulated DC voltage power supply circuit groups 40a–40m or 70a–70m are used as shown in FIGS. 4 and 5. Considering the ratio of the area that a power semiconductor switch (or power semiconductor switches) and a control IC (or control ICs) occupy to the entire area of a semiconductor substrate when the switch or switches are turned on and off at a high speed in response to the output of the control IC or ICs, the ratio is greatly reduced from about ⅕ in the conventional device in which only one semiconductor power switch is used to about ¹⁄₁₀₀₀ in this embodiment. In addition, it can obviate a drive circuit. The high frequency loss in the transformer 18 is significantly reduced when the switching frequency of the MOSFETs 12 is 1 MHz or more. In particular, the reduction in loss becomes remarkable at 10 MHz or more, at which small transistors approach their operation limits.

Thus, the regulated DC voltage power supply of the present embodiment is effective in increasing the switching frequency beyond 1 MHz, and is especially suitable for mass-produced small capacity power supplies of 1–10 watts. According to the present invention, inexpensive DC voltage regulated power supplies can be provided whose switching frequency is as high as 1–10 MHz, whose chip size is from a few millimeters square to 20 millimeters square, and is less than 1 mm in thickness, and whose conversion efficiency is as high as 70–80%.

Although the capacitors 16b as shown in FIG. 1B are incorporated in the regulated DC voltage power supply in the embodiments 1–3, they can be connected across the DC load instead. Furthermore, although a DC input voltage is supposed to be fed to the input terminals in these embodiments 1–3, an AC voltage may be supplied to the input terminals if a rectifier and a smoothing filter are provided to convert the AC voltage into a DC voltage.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A regulated DC voltage power supply comprising:
   a plurality of regulated DC voltage power supply circuit groups connected in parallel, each of which includes a plurality of power circuits which are connected in parallel, each of said power circuits including a semiconductor switch chopping an input voltage, and a filter smoothing the chopped voltage produced from said semiconductor switch; and
   control means for controlling switching timings of said semiconductor switch in each of said power circuits;
   said control means including,
      detecting means for detecting an amount corresponding to a load quantity required by a load,
      control means for starting generating, for each of said regulated DC voltage power supply circuit groups, an original switching signal when the detected amount exceeds a lower set value predetermined for each of said regulated DC voltage power supply circuit groups, and for stopping generating the original switching signal when the detected amount exceeds an upper set value predetermined for each of said regulated DC voltage power supply circuit groups, and
      timing adjusting means for generating a plurality of switching signals in response to said original switching signal, each of said switching signals turning on and off each one of said semiconductor switches of said plurality of power circuits at different timings.

2. The regulated DC voltage power supply as claimed in claim 1, wherein said regulated DC voltage power supply is integrated into one chip.

3. The regulated Dc voltage power supply as claimed in claim 2, wherein each of said power circuits comprises a transformer which comprises a primary winding made of a thin film, a secondary winding made of a thin film, and a magnetic circuit made of a magnetic thin film.

4. The regulated DC voltage power supply as claimed in claim 3, wherein said transformer is a shell-type transformer, and said magnetic circuit of said transformer comprises slits formed perpendicularly to a winding direction of said primary and secondary windings.

5. The regulated DC voltage power supply as claimed in claim 1, wherein each of said regulated DC voltage power supply circuit groups has a different lower set value, and any one of said regulated DC voltage power supply circuit groups having a greater lower set value has a greater upper set value.

6. The regulated DC voltage power supply as claimed in claim 1, wherein said switching signals are each shifted in timing by Tc/n, where Tc is the period of said original switching signal, and n is the number of said power circuits.

* * * * *